(12) United States Patent
Lichoulas et al.

(10) Patent No.: US 9,448,366 B2
(45) Date of Patent: Sep. 20, 2016

(54) SMALL FORM FACTOR FIELD INSTALLABLE OUTSIDE PLANT CONNECTOR HOUSING

(71) Applicant: AFL Telecommunications LLC

(72) Inventors: Ted Lichoulas, Simpsonville, SC (US); Eddie Kimbrell, Dacula, GA (US); Chuck Turner, Greenville, SC (US); Steve Polidan, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/422,915

(22) PCT Filed: Oct. 21, 2013

(86) PCT No.: PCT/US2013/065933
§ 371 (c)(1),
(2) Date: Feb. 20, 2015

(87) PCT Pub. No.: WO2014/063154
PCT Pub. Date: Apr. 24, 2014

(65) Prior Publication Data
US 2015/0219857 A1    Aug. 6, 2015

Related U.S. Application Data

(60) Provisional application No. 61/716,003, filed on Oct. 19, 2012.

(51) Int. Cl.
*G02B 6/38* (2006.01)
*G02B 6/42* (2006.01)

(52) U.S. Cl.
CPC ........... *G02B 6/3816* (2013.01); *G02B 6/3825* (2013.01); *G02B 6/3887* (2013.01); *G02B 6/3893* (2013.01); *G02B 6/4248* (2013.01)

(58) Field of Classification Search
CPC    G02B 6/3816; G02B 6/3825; G02B 6/3887; G02B 6/3893
USPC .......................................................... 385/60
See application file for complete search history.

(56) References Cited

U.S. PATENT DOCUMENTS

| 5,530,783 A * | 6/1996 | Belopolsky .......... G02B 6/3897 385/53 |
| 2005/0041928 A1* | 2/2005 | Zimmel et al. ................. 385/55 |

(Continued)

OTHER PUBLICATIONS

International Search Report for PCT/US2013/065933 dated Mar. 18, 2014.

(Continued)

*Primary Examiner* — Jerry Blevins
(74) *Attorney, Agent, or Firm* — Dority & Manning, P.A.

(57) ABSTRACT

A connector housing apparatus for allowing field engineers or technicians to run cable point to point, and to protect the connection in an environmentally sealed, crush resistant housing is provided. The connector housing apparatus includes a connector housing body, two sealing boots, two sealing elements, two seal nuts, a fiber optic adapter, a fiber optic adapter insert that holds the fiber optic adapter and two fiber optic pigtails connected to two fiber optic cables. Each boot has two seal points. The first seal is between the fiber optic cable, the sealing element, the seal nut and the tapered portion of the sealing boot. The second seal is between the snap finger on the sealing boot and the receiving catch on the connector housing body.

22 Claims, 15 Drawing Sheets

(56) References Cited

U.S. PATENT DOCUMENTS

2008/0050070 A1* 2/2008 Gurreri et al. .................. 385/55
2012/0063723 A1* 3/2012 Jenkins et al. .................. 385/78

OTHER PUBLICATIONS

Written Opinion for PCT/US2013/065933 dated Mar. 18, 2014.

* cited by examiner

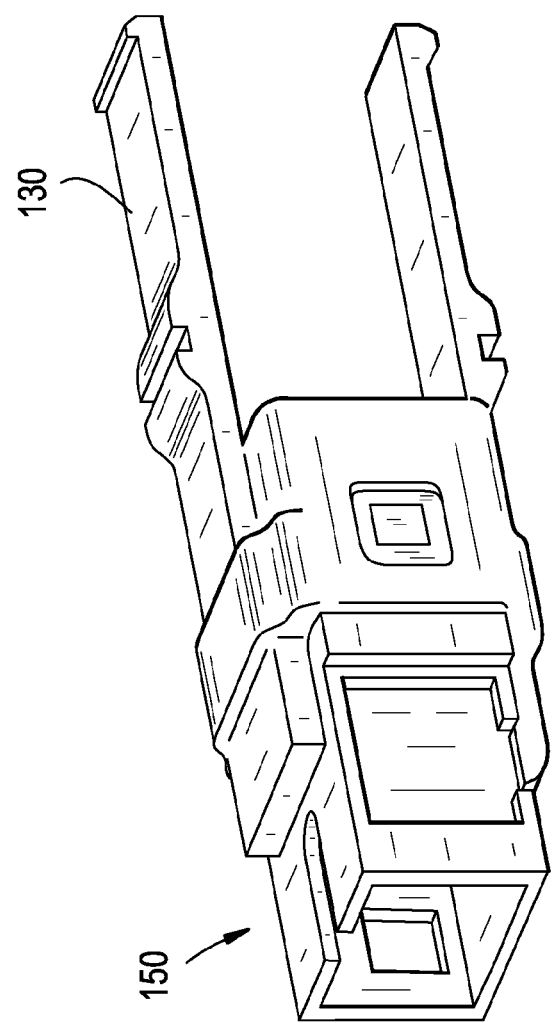

SMALL FORM FACTOR FIELD INSTALLABLE OUTSIDE PLANT CONNECTOR HOUSING

CROSS-REFERENCE TO RELATED APPLICATIONS

This application is based upon and claims the benefit of priority from U.S. Provisional Application No. 61/716,003, filed Oct. 19, 2012 in the United States Patent and Trademark Office, the disclosures of which are incorporated herein in its entirety by reference.

BACKGROUND

1. Field

The invention is related to a connector housing, and more particularly to a small form factor field installable outside plant connector housing.

2. Related Art

The background information provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

In the Private Network and Industrial markets, there is a continuing trend where copper based communication wiring is being replaced with fiber optic cabling for communication and sensing applications. The traditional method to cable these networks is to use factory terminated harsh environment fiber optic connectors or splice enclosures to protect system interconnector points. Although these methods are reliable and well-accepted within these industries, this approach requires system designers to dedicate substantially more upfront engineering work on the layout and design of these systems. Additionally, expensive installation hardware and field technicians are needed to install these systems. Both these conditions can make fiber optic systems less attractive financially than copper based systems.

Some Existing Products Include:

Corning Optitap—This Optitap is a factory installed hardened SC connector.

Corning Optitip—The Optitip is a factory installed MT connector.

Lcomm (distributor) offers factory installed duplex LC connectors.

Senko—IP Series

Diamond—Outdoor industrial connector

Huber Suhner—Instrial Cabling

It is an object of the present invention to provide small form factor field installable outside plant connector housing that can be used to reduce the installation cost of these systems by allowing field engineers or technicians to run cable point to point, and make field installable connections as needed at the interconnect points, and protect these connection points in an environmental sealed, crush resistant housing. The invention can be used for in-line, enclosure, and conduit transitions, providing a high degree of installation flexibility. This approach can reduce the amount of upfront job planning needed for a particular system and allow less skilled installation personnel to complete the installation.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

According to an exemplary embodiment, a connector housing apparatus includes a connector housing body, a first sealing boot, a second sealing boot, a first seal nut, a second seal nut, a fiber optic adapter configured to connect to a first fiber optic pigtail and a second fiber optic pigtail, and a fiber optic adapter insert that holds the fiber optic adapter. The first sealing boot and the second sealing boot are connected to the connector body housing at opposite ends of the connector housing body and the first seal nut is connected to the first seal boot and the second seal nut is connected to the second boot.

According to another exemplary embodiment, the connector housing body further includes a first sealing element, and a second sealing element. A first fiber optic cable connected to the first fiber optic pigtail, the first sealing element, the first seal nut and a tapered section of the first sealing boot form a first seal, and a second fiber optic cable connected to the second fiber optic pigtail, the second sealing element, the second seal nut and a tapered section of the second sealing boot form a second seal.

According to another exemplary embodiment, the connector housing body includes a first snap finger and a second snap finger at its opposite ends. The first sealing boot includes a receiving catch, the second sealing boot includes a receiving catch, the first snap finger of the connector housing body and the receiving catch of the first sealing boot are connected to form a third seal, and the second snap finger of the connector housing body and the receiving catch of the second sealing boot are connected to form a fourth seal.

According to another exemplary embodiment, the connector housing body includes a an enclosure mounting shoulder and external threads on one end allowing for installation of the connector housing apparatus on an enclosure.

According to another exemplary embodiment, the connector housing apparatus also includes a locking nut. When the first sealing boot is removed, the connector housing apparatus can be mounted onto an exterior surface of the enclosure using the locking nut.

According to another exemplary embodiment, the fiber optic adapter insert comprises a receiving catch which snaps into a retention tab on the inner surface of the connector housing body.

According to another exemplary embodiment, the fiber optic adapter insert includes a cutout which can be modified to accommodate a variety of fiber optic adapters, and the fiber optic adapter insert cutout can be modified to accommodate one or more adapters.

According to another exemplary embodiment, the variety of fiber optic adapters includes one of simplex FC, simplex ST, simplex LC, simplex SC, simplex MU, duplex LC, duplex MU, and MPO/MTP adapters.

According to another exemplary embodiment, the first sealing element and the second sealing element are at least one of elastomer seal grommet, b-sealing tape, closed cell foam tape, compressible elastomer and molded grommet.

According to another exemplary embodiment, the connector housing body shoulder and the connector housing body are sized to fit National Pipe Taper (NPT) port sizes.

According to another exemplary embodiment, the first fiber optic pigtail includes a fiber optic connector body and a fiber optic connector boot, the second fiber optic pigtail includes a fiber optic connector body and a fiber optic connector boot, and the fiber optic connector body of the first fiber optic pigtail and the fiber optic connector body of the second fiber optic pigtail are connected with the fiber optic adapter.

According to another exemplary embodiment, the connector housing apparatus further includes a first O-Ring, and a second O-Ring. The connector housing body includes a first groove which holds the first O-Ring and a second groove which holds the second O-Ring. When the first sealing boot is connected to the connector housing body, the first sealing boot, the first O-Ring and the connector housing body form a seal, and when the second sealing boot is connected to the connector housing body, the second sealing boot, the second O-Ring and the connector housing body form a seal.

According to another exemplary embodiment, the connector housing apparatus further includes a first O-Ring, and a second O-Ring. The first sealing boot comprises a first groove on its interior surface which holds the first O-Ring, the second sealing boot comprises a second groove on its interior surface which holds the second O-Ring. When the first sealing boot is connected to the connector housing body, the first sealing boot, the first O-Ring and the connector housing body form a seal, and when the second sealing boot is connected to the connector housing body, the second sealing boot, the second O-Ring and the connector housing body form a seal.

According to another exemplary embodiment, the connector housing apparatus can be disassembled and reassembled.

According to another exemplary embodiment, the connector housing apparatus can be mounted to a bulkhead in at least one of a single and gang mounted manner.

According to another exemplary embodiment, the connector housing apparatus can be installed on one of an enclosure, closure, terminal and junction box.

According to another exemplary embodiment, the connector housing body comprises a conduit transition adapter allowing installation of the connector housing apparatus on a conduit pipe.

According to another exemplary embodiment, the connector housing apparatus further includes a wall mount adapter bracket. the connector housing body further includes a recessed pocket, and the recessed pocket mates with the wall mount adapter bracket allowing for installation of the connector housing apparatus on walls or rails.

According to another exemplary embodiment, the first seal boot and the second seal boot further comprise a seal nut retention groove, a sealing element compression dam to hold the first sealing element and the second sealing element, and a ram quarter turn twist lock feature. The first seal nut is connected to the first seal boot using the seal nut retention groove of the first seal boot. The second seal nut is connected to the second seal boot using the seal nut retention groove of the second seal boot. The first seal nut and the second seal nut use the ram quarter turn twist lock feature for seal nut compression lock.

According to another exemplary embodiment, the connector housing body further includes a snap finger release tab to allow for disengaging of the sealing boot from the connector housing body.

According to another exemplary embodiment, the first sealing boot forms a seal which protects against the effect of immersion in water to a depth of up to 1 m, and the second sealing boot forms a seal which protects against the effect of immersion in water to a depth of up to 1 m.

BRIEF DESCRIPTION OF THE DRAWING

FIG. 6 shows the detail of fiber optic adapter and fiber optic adapter insert according to an exemplary embodiment of the invention.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
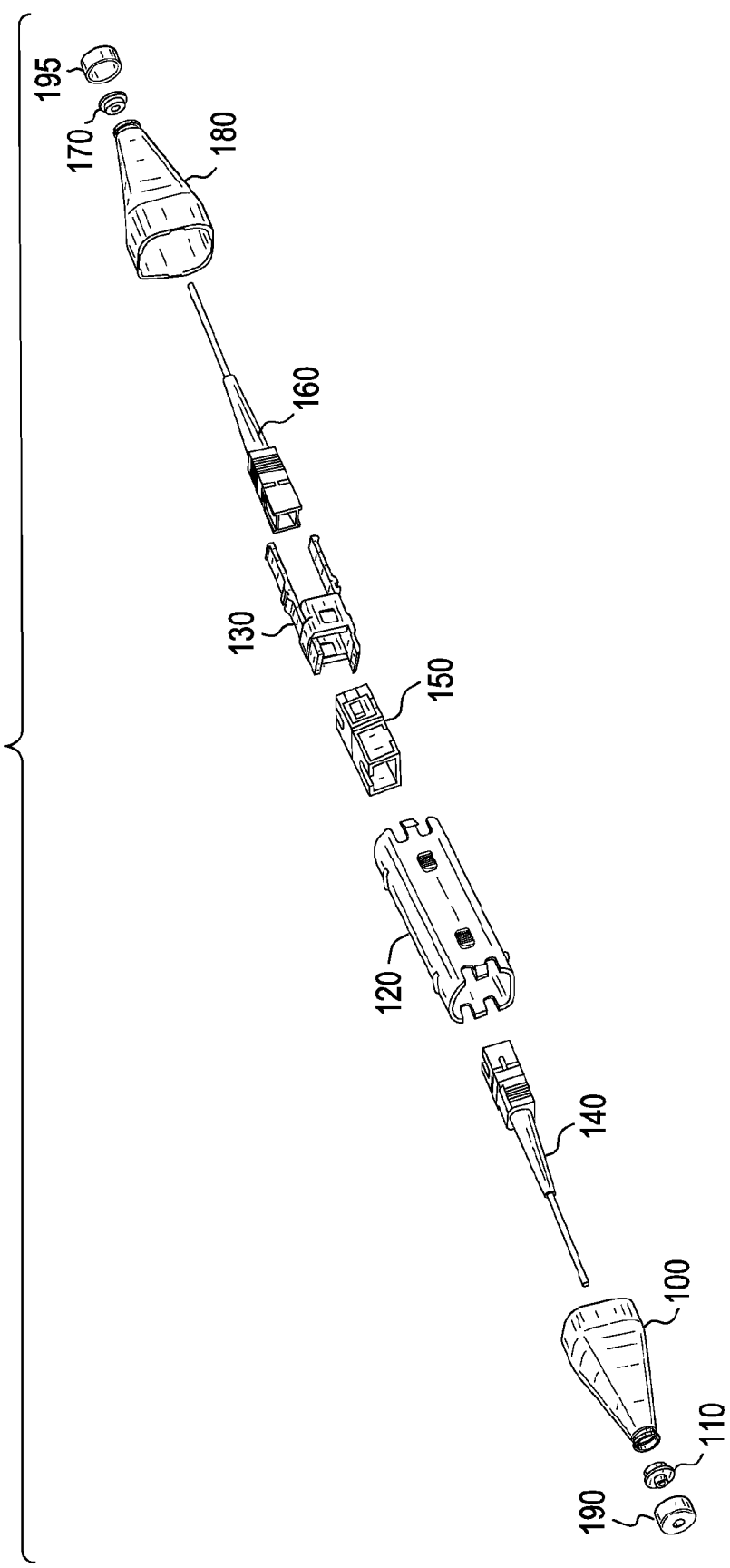
FIG. 1 is an exploded view of an exemplary embodiment of the invention showing two fiber optic connectors with a single adapter.

Referring to the drawings, FIG. 1 is an exploded view showing two fiber optic connectors connected with a single adapter within the housing. According to an exemplary embodiment, the connector housing apparatus includes two sealing boots (100, 180), a connector housing body 120, two sealing elements (110, 170), which may include but are not limited to an elastomer sealing grommet, b-sealing tape, a closed cell foam tape, a compressible elastomer, or a molded grommet, two sealing nuts (190, 195), a fiber optic adapter insert 130, a fiber optic adapter 150 and two fiber optic pigtails (140, 160). FIG. 1 only shows the SC fiber optic connectors for illustration purposes. Other fiber optic connectors (FC, ST, LC, MPO/MTP, etc.) could also be used. The fiber optic pigtails include the fiber optic connector body (142, 162) and the fiber optic connector boot (143, 163) according to an exemplary embodiment, as further described below in reference to FIG. 4.

Figure 2:
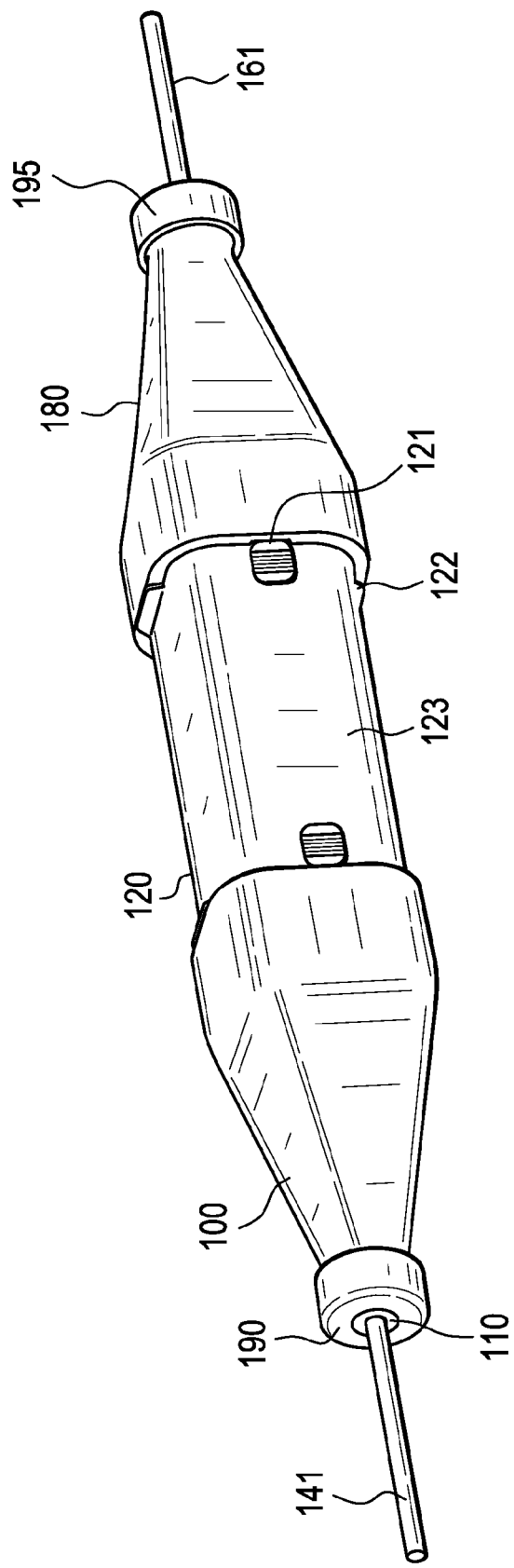
FIG. 2 is an assembled exterior view of an exemplary embodiment of the invention showing two fiber optic connectors with a single adapter within the housing.

FIG. 2 is an assembled exterior view of two fiber optic connectors with a single adapter within the housing. According to an exemplary embodiment, the two optic pigtails (140, 160) are connected to two fiber optic cables (141, 161). The connector housing body includes snap finger release tabs 121 and connector housing body shoulder 122 which allow field technicians to disengage the sealing boot from the connector housing body in the event access is needed after assembly. The sealing nut (190, 195) and sealing element (110, 170) provide seal between the cable and the penetration at the tapered end of the sealing boot (100, 180). A cable seal grommet may be used as the sealing element and sized to the cable's outside diameter. According to an exemplary embodiment, the connector housing apparatus includes a recessed pocket in connector housing body for mating to wall mount bracket, thereby facilitating installation on walls, rails etc. The connector housing apparatus has a small size and a square shape that minimizes rolling of the housing on flat surfaces, according to an exemplary embodiment.

Figure 3A:
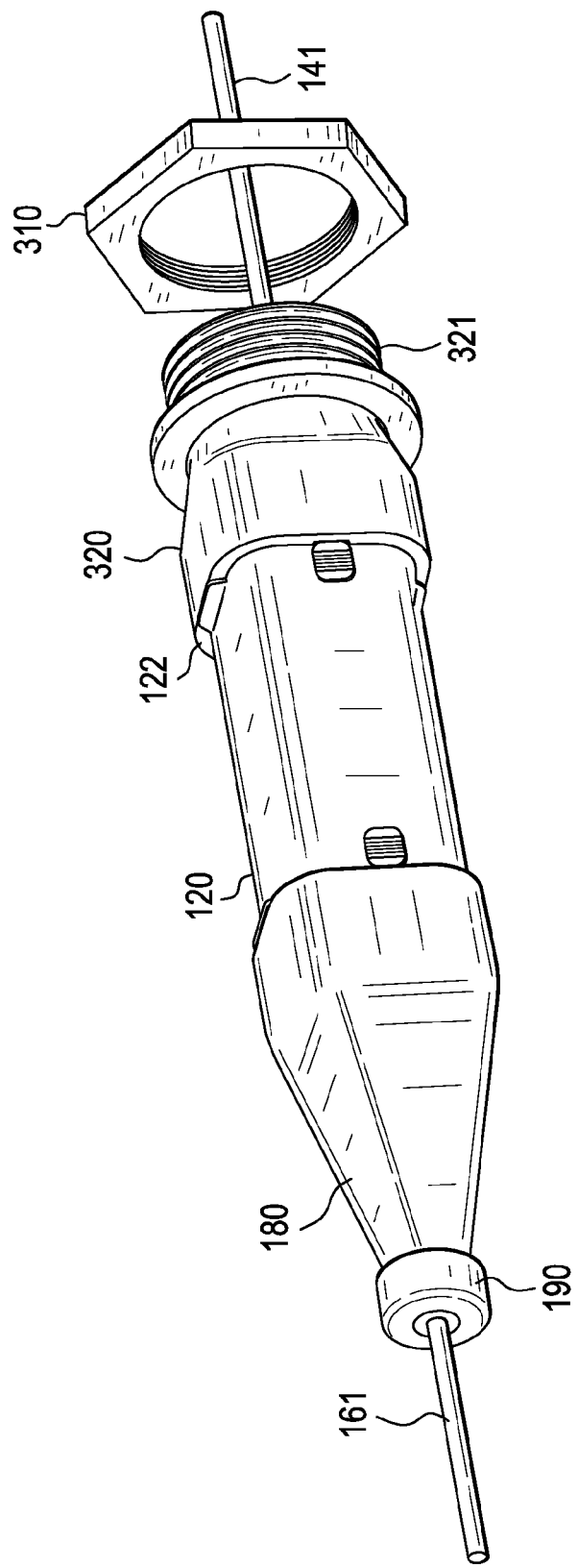
FIG. 3a is an assembled exterior view of an exemplary embodiment of the invention showing two fiber optic connectors with Enclosure Transition Adaptor.

FIG. 3a is an assembled exterior view of two fiber optic connectors with enclosure transition adaptor. According to an exemplary embodiment, the connector housing includes an enclosure transition adaptor 320 that allows for the connector housing apparatus to be installed to an enclosure, closure, terminal, or junction box with a round access point. The enclosure transition adaptor 320 can be sized to different industry standard port sizes and geometries. The connector housing body and the connector housing body shoulder can be sized to fit National Pipe Taper (NPT) port sizes according to another exemplary embodiment. The connector housing further includes an enclosure locking nut 310, according to an exemplary embodiment. When installed, the enclosure transition adaptor 320 forms a seal with the connector housing body and the enclosure.

Figure 3B:
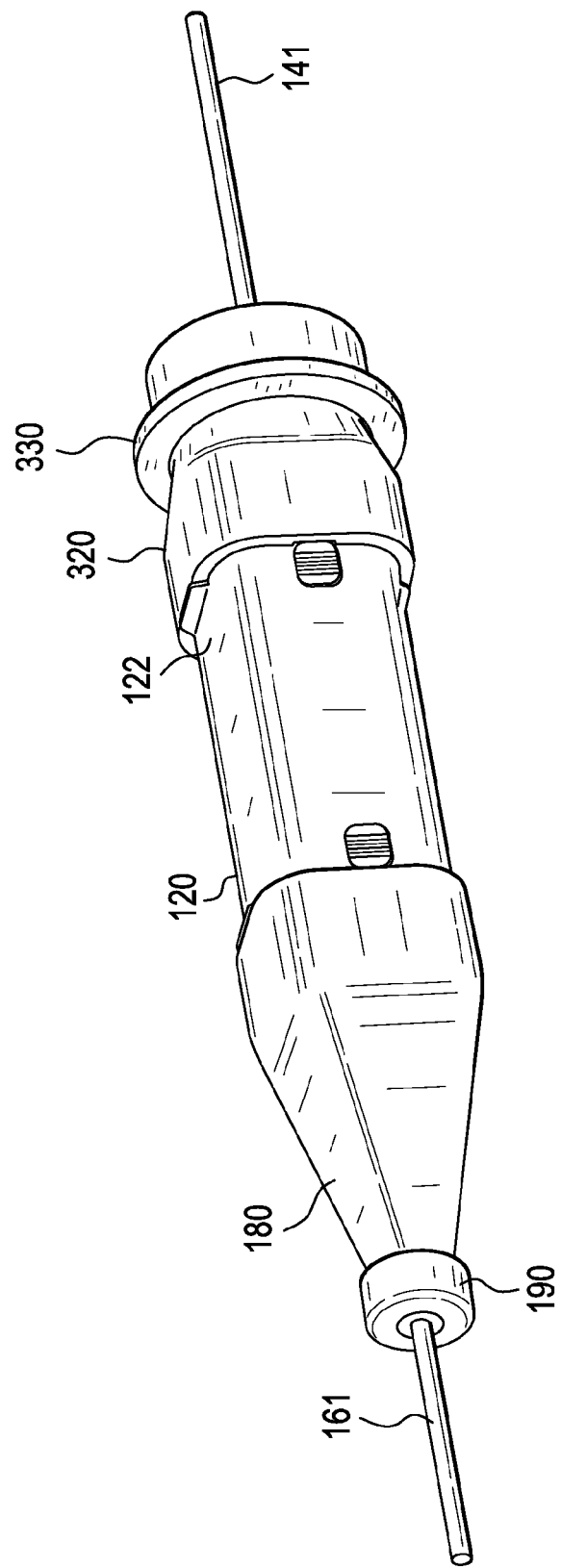
FIG. 3b is an assembled exterior view of an exemplary embodiment of the invention showing two fiber optic connectors with Conduit Transition Adaptor.

FIG. 3b is an assembled exterior view of two fiber optic connectors with conduit transition adaptor. According to an exemplary embodiment, the connector housing includes a conduit transition adaptor 330 that allows the connector housing to be installed in line on a conduit pipe. The conduit transition adaptor can be sized to different conduit diameters and can be lengthened to provide sufficient storage room for slack fiber needed for the field termination process. When installed, the conduit transition adaptor 330 forms a seal with the connector housing body and conduit.

Figure 4:
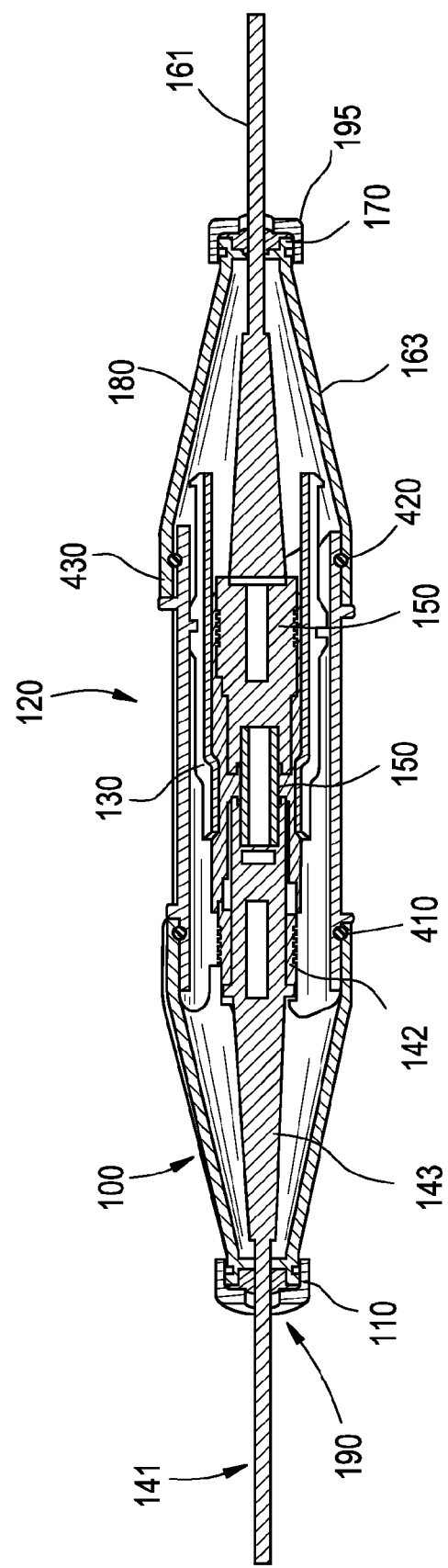
FIG. 4 is a cross sectional view of an exemplary embodiment of the invention showing two fiber optic connectors with a single adapter within the housing.

FIG. 4 is a cross sectional view of two fiber optic connectors with a single adapter with the housing. While SC connectors are shown for illustration purposes, other fiber optic connectors (FC, ST, LC, MPO/MTP etc.) can be used. According to an exemplary embodiment, a first seal is between the fiber optic cable 141, sealing element (cable seal grommet) 110, sealing nut 190, and a taper portion of the sealing boot 100. A second seal is between the fiber optic cable 161, sealing element (cable seal grommet) 170, sealing nut 195, and a taper portion of the sealing boot 180. The arms of the fiber optic adapter insert 130 extend beyond the plane of the connector housing opening, according to an exemplary embodiment. This feature allows for easy removal of a fiber optic adapter installed in the connector body with and without connectors installed. It allows connectors to be installed and tested outside the connector body housing and installed in the connector body housing after testing. Furthermore, fiber optic insert can be installed from either side of the connector housing body, according to an exemplary embodiment. The fiber optic adapter insert 130 is designed to accept a simplex SC adapter, duplex LC adapter, or MPO/MTP adapter according to an exemplary embodiment. Different fiber optic adapter inserts can be used/interchanged in the field to accommodate the installation needed.

According to an exemplary embodiment, the connector housing body 120 comprises of two grooves which can hold O-Rings (410, 420). The groove may be placed between the connector housing body shoulder 122 and the snap fit interface 430, according to an exemplary embodiment.

The seals are designed to be compliant with ingress protection standards such as IP-67. For example, the seal may be designed to protect against the effect of immersion in a liquid to a depth of up to 1 m.

Figure 5:
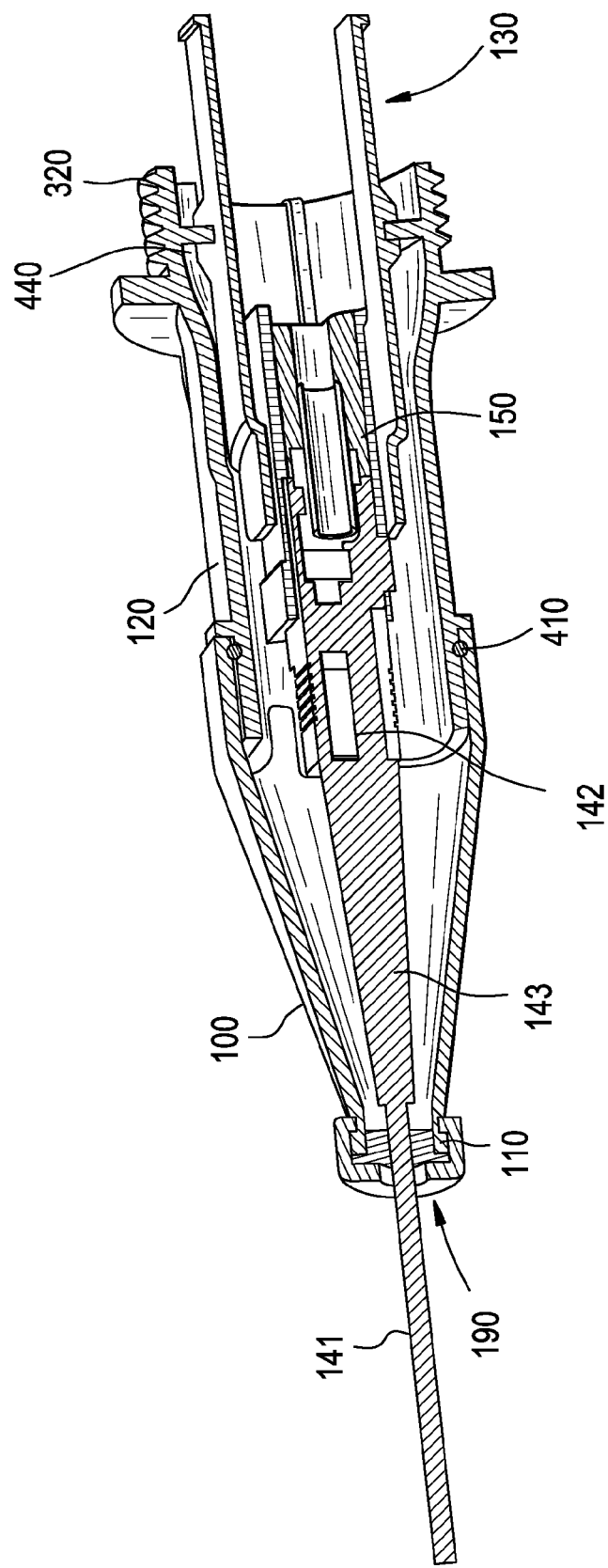
FIG. 5 is a close up of a cross sectional view of an exemplary embodiment of the invention with Enclosure Transition Adaptor.

FIG. 5 is a close up of a cross sectional view of two fiber optic connectors with a single adapter in a housing with enclosure transition adaptor. On connecting the sealing boot 100 with the connector housing body 120, the O-Ring, along with the connector housing body and the sealing boot, forms a seal. According to an exemplary embodiment, the fiber optic adapter insert 130 and the interior of the enclosure transition adaptor have a snap fit interface 440. According to another exemplary embodiment, the fiber optic adapter insert 130 and the interior of the connector housing body have a snap fit interface (not shown).

Figure 10:
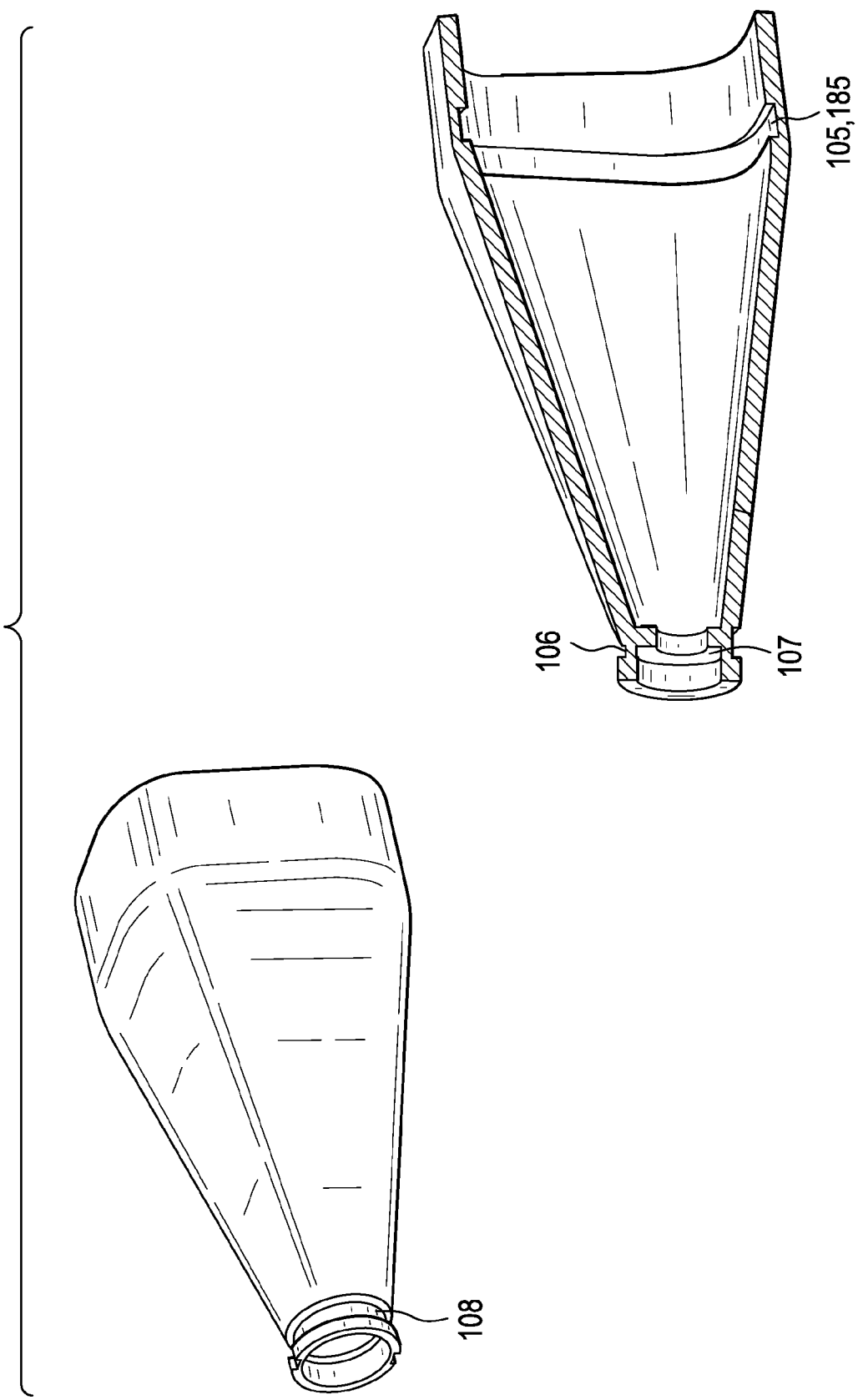
FIG. 10 shows the detail of seal boot according to an exemplary embodiment of the invention.

According to another exemplary embodiment, the O-Ring grooves may be placed on the interior surface of the sealing boots (not shown). Each sealing boot may incorporate a groove on its inner surface between the edge and the snap fit receiving catch 105, 185 (FIG. 10). On connecting the sealing boot with the connector housing body on either side, the O-Ring, along with the connector housing body and the sealing boot, forms a seal.

FIG. 6 shows the detail of fiber optic adapter and fiber optic insert. According to an exemplary embodiment, the cutout on the fiber optic adapter insert can be modified to accommodate a variety of fiber optic adaptors like simplex FC, simplex ST, simplex LC, simplex SC, simplex D4, simplex MU, duplex LC, duplex MU, MTRJ and MPO/MTP. The fiber optic adapter insert may be interchangeable and there more be one or more connectors and connector types used according to an exemplary embodiment.

Figure 7A:
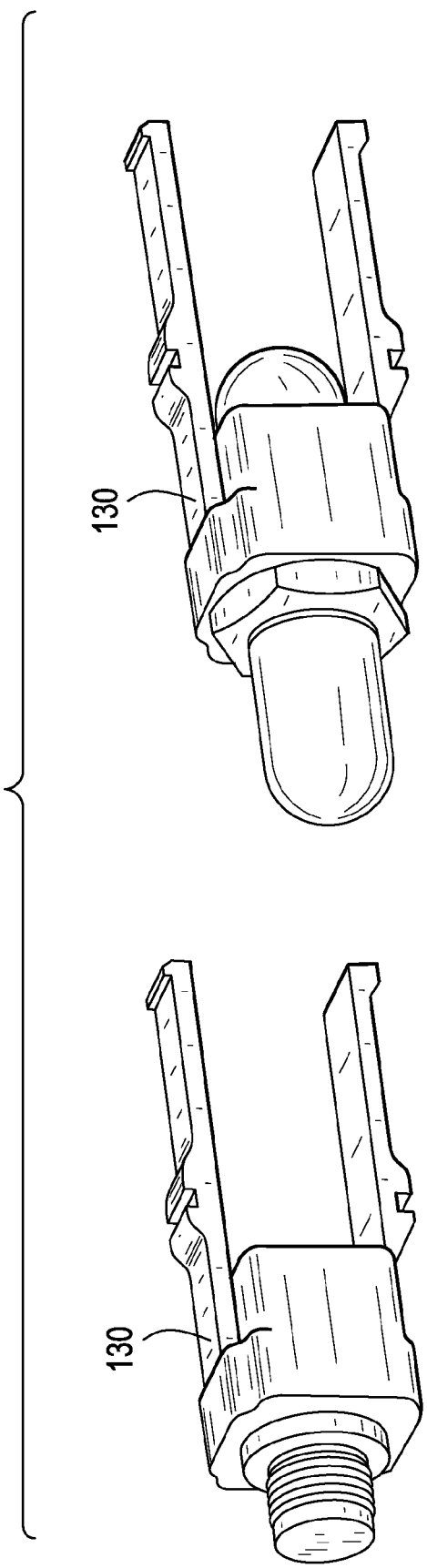
FIG. 7a shows the detail of fiber optic insert interchangeable with multiple connector types according to an exemplary embodiment of the invention.

FIG. 7a shows the detail of fiber optic insert interchangeable with multiple connector typed, according to an exemplary embodiment.

Figure 7B:
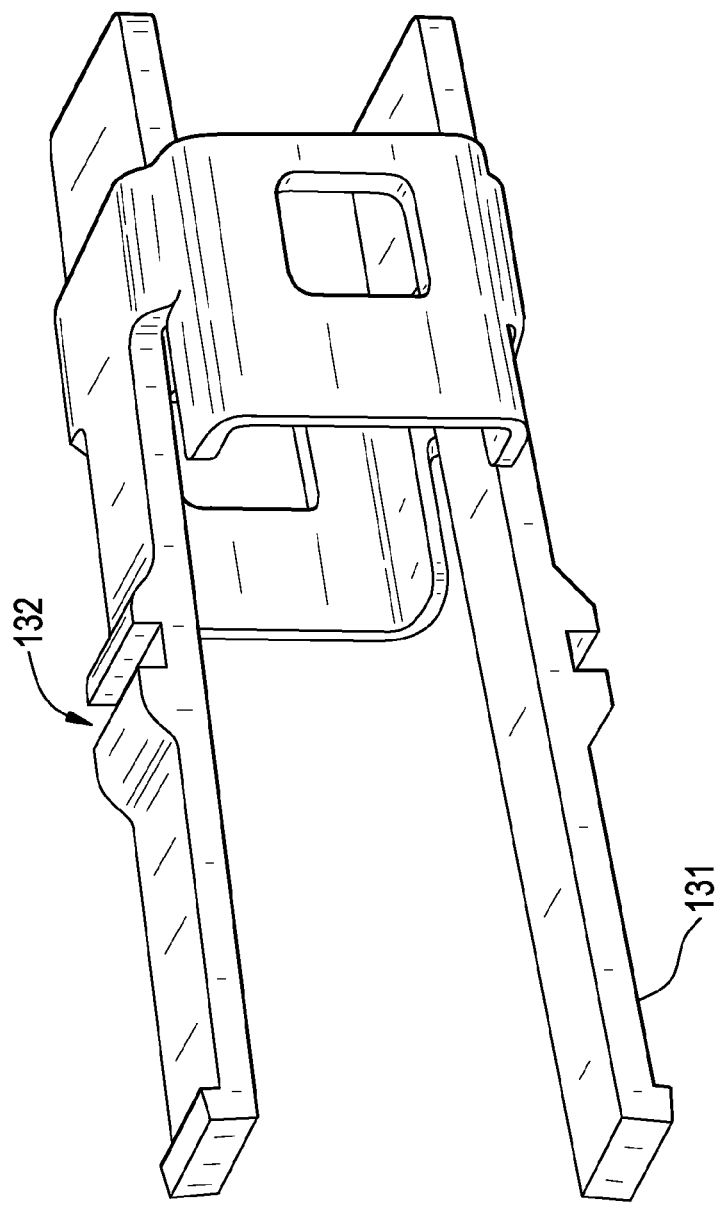
FIG. 7b shows the detail of fiber optic insert according to an exemplary embodiment of the invention.

FIG. 7b shows the detail of fiber optic insert. According to an exemplary embodiment, the fiber optic adapter insert includes a receiving catch for housing stop 132 corresponding to the snap fit interface 440 between the fiber optic adapter insert and the housing body 120/enclosure transition adapter 320. The fiber optic adapter interface further includes a snap finger 131, according to an exemplary embodiments.

Figure 8:
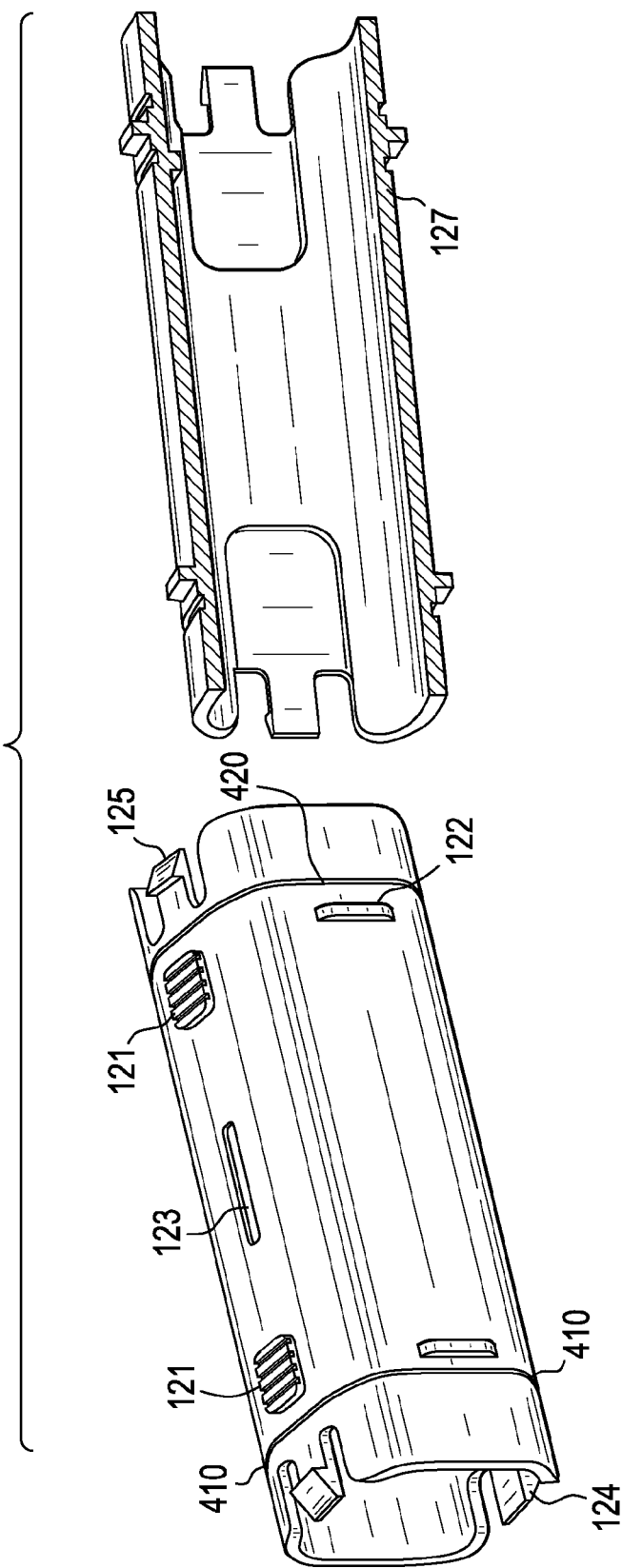
FIG. 8 shows the detail of connector housing body according to an exemplary embodiment of the invention.

FIG. 8 shows the detail of connector housing body 120. According to an exemplary embodiment, the connector housing body shoulder 122, O-Ring grooves 410 and 420, snap finger (124, 125) that shares a complementary features with the snap fit receiving catch (see description of FIG. 10 below—105, 185), snap finger release tab 121, a recessed pocket in connector body 123 and a retention tab for snap finger 130 corresponding to the snap fit interface between the connector housing body 120 and the mating fiber optic adapter insert 130. The recessed pocket in the connector housing body 123 allows mating with wall mount bracket option, according to an exemplary embodiment. The snap finger (124, 125) corresponds to the snap fit interface between the sealing boot (100, 180) and the connector housing body (120).

Figure 9:
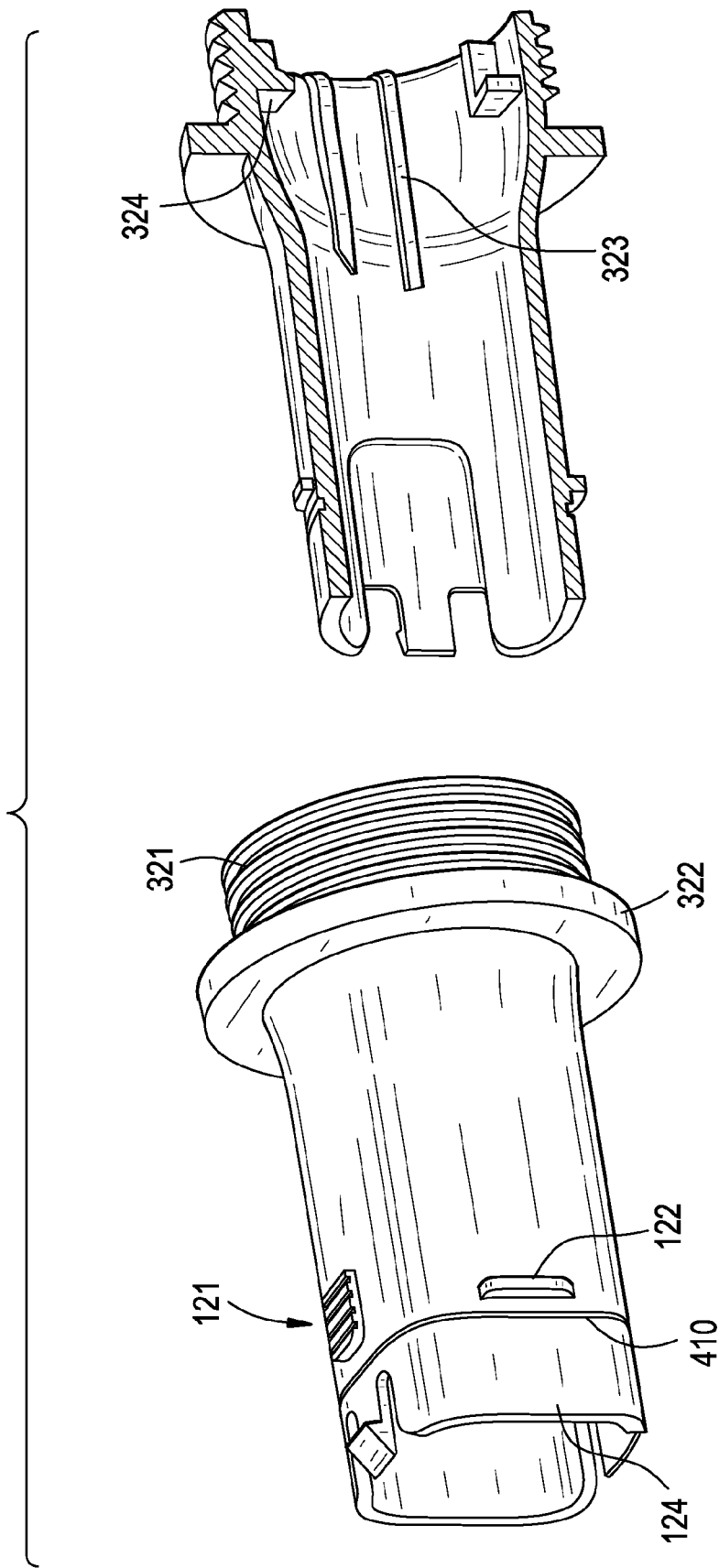
FIG. 9 shows the detail of connector housing body with Integral Enclosure Transition Adaptor according to an exemplary embodiment of the invention.

FIG. 9 shows the detail of connector housing body 120 with integral enclosure transition adapter, according to another exemplary embodiment. According to an exemplary embodiment, the one exterior edge of the connector housing body 120 includes a snap finger 124 that shares a complementary features with the snap fit receiving catch (see description of FIG. 10 below—105, 185) of the sealing boot to retain the sealing boot, ensuring that the sealing boot is held in the optimal position for sealing. If a filed technician desires to access the interior of the connector housing, the technician may depress the snap boots with a tool in order release the sealing boot from the connector housing. The connector housing body further includes a snap finger release tab 121, an O-Ring 410 and a connector housing body shoulder 122 on the same exterior edge. On the opposite edge, the connector housing body includes an enclosure mounting shoulder 322 and external threads for locknut 321 which allow formation of a seal with an enclosure. The interior surface on the adapter edge further includes adapter insert guide ribs 323 and a retention tab for snap finger 324 which corresponds to the snap fit interface between the connector housing body 120 and the mating fiber optic adapter insert 130, according to an exemplary embodiment.

FIG. 10 shows the detail of sealing boot (100, 180). According to an Exemplary embodiment, the sealing boot includes receiving catches for snap fingers (105, 185) which mate with the snap fit interface of the mating connector housing body 120. The sealing boot further includes a seal nut retention groove 106, seal grommet compression dam 107 and a ramp quarter turn twist lock feature 108. The ramp quarter turn twist lock feature allows for a seal nut compression lock.

Figure 11:
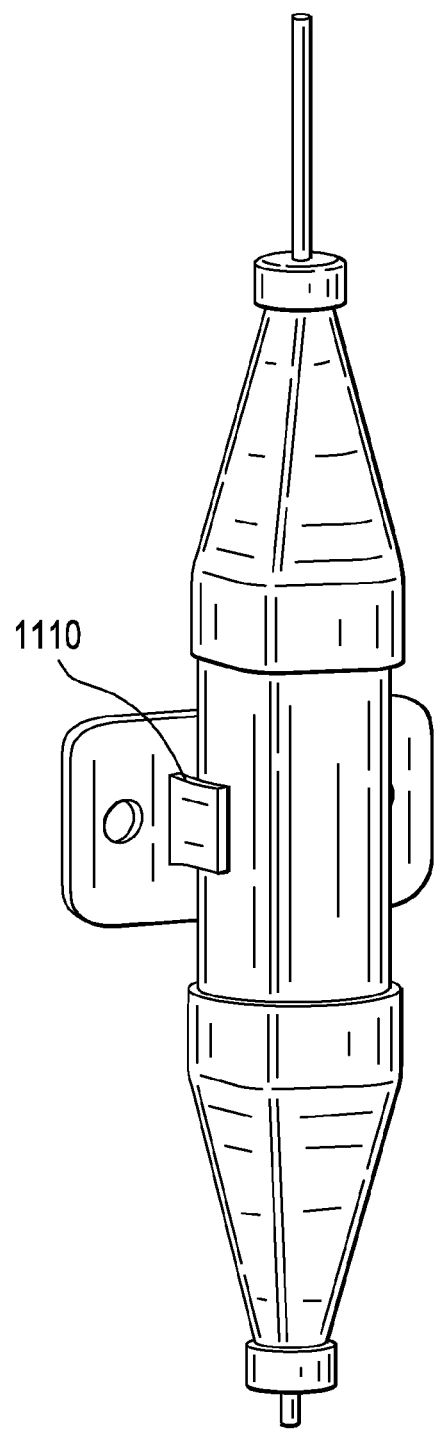
FIG. 11 shows an exterior view of wall mount adaptor bracket for the housing according to an exemplary embodiment of the invention.

FIG. 11 shows the exterior view of a wall mount adapter bracket for the connector housing. According to an exemplary embodiment, the recessed pocket in the connector housing body 123 mates with the wall mount bracket 1110. Although a flat mounting surface is shown, other geometries can be designed to facilitate installation on curved or irregular surfaces.

Figure 12:
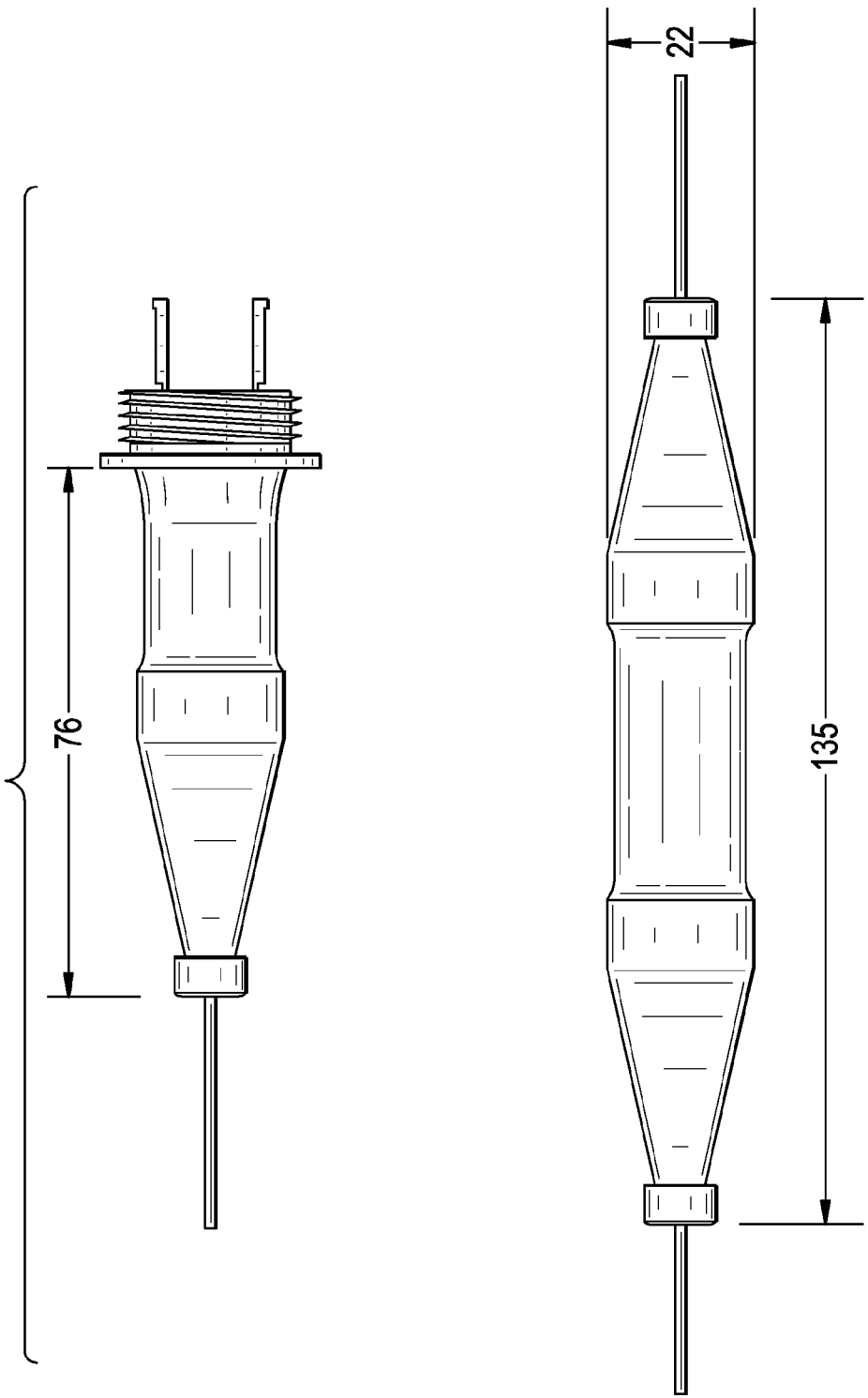
FIG. 12 shows an assembled exterior view of the housing with and without an Enclosure Transition Adaptor with dimensions according to an exemplary embodiment of the invention.

FIG. 12 shows the assembled exterior view the connector housing with and without the enclosure adapter with dimensions showing the small form factor, according to an exemplary embodiment. While a fixed set of dimensions are shown, the housing can have different/varied dimensions.

Figure 13:
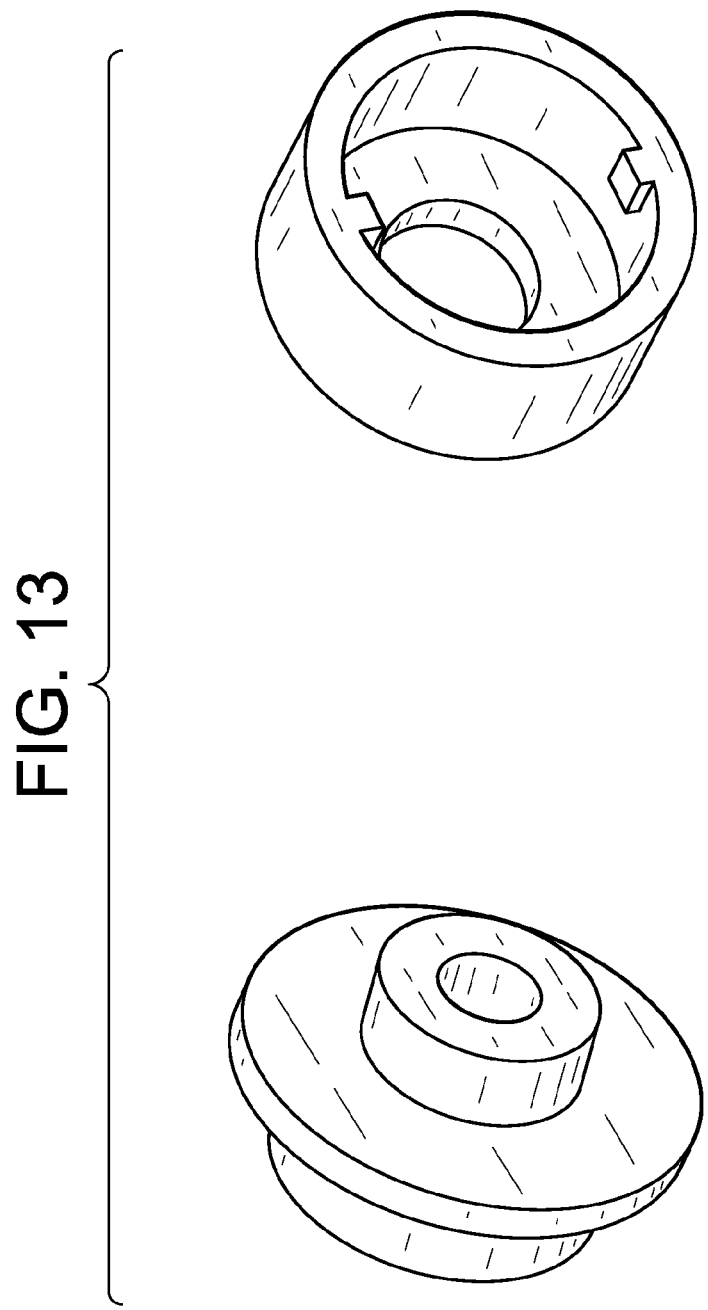
FIG. 13 shows the details of an elastomer seal grommet and a seal nut according to an exemplary embodiment of the invention.

FIG. 13 shows the detail of an exemplary elastomer seal grommet and a seal nut.

As explained above, with reference to the drawings, the exemplary embodiments of the connector housing are compatible with field installable connectors on the market (FAST connector, Fuse Connect, etc.) as well as with commercially available/common fiber optic adapters.

The connector housing apparatus, according to an exemplary embodiment, can be disassembled and reassembled. The connector housing apparatus can further be mounted to a bulkhead in a single or a gang mounted manner according to another exemplary embodiment.

The above described connector housing can be applied to simplex, duplex, and multifiber connectors. The embodiments are further compatible with common cable sizes (2 mm, 3 mm, and 4.8 mm) Furthermore, it can be installed in field with minimal tools and no electrical power and thus, leads to low cost.

The connector housing apparatus can be configured in the field by changing Fiber Optic Adapter Insert and Sealing Grommet and can further easily be adapted to mate with conduits and enclosures as discussed above. The connector housing apparatus, according to an exemplary embodiment, does not require new custom cables to be purchased in the event the an error is made in determining the overall cable length and connector interface point or if cable or connector is damaged during installation. This allows the new design to be re-routed in the field as needed due the routing obstructions or if a better routing method is discovered during installation and minimizes slack loop storage. The connector housing parts can be made in a clear resins to allow for visual inspection w/o the need to open the connector housing assembly. The new design can be internally plated to reduce EMI/RFI interference if needed. Furthermore, the new design can easily be labeled or branded as needed.

As mentioned above, the embodiments described above are merely exemplary and the general inventive concept should not be limited thereto. While this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

The invention claimed is:
1. A connector housing apparatus comprising:
a connector housing body;
a first sealing boot;
a second sealing boot;
a first seal nut;
a second seal nut;
a first sealing element;
a second sealing element;
a fiber optic adapter configured to connect to a first fiber optic pigtail and a second fiber optic pigtail; and
a fiber optic adapter insert that holds the fiber optic adapter, wherein,
the first sealing boot and the second sealing boot are connected to the connector housing body at opposite ends of the connector housing body,
the first seal nut is connected to the first seal boot and the second seal nut is connected to the second boot,
the connector housing body is configured to surround an entirety of the fiber optic adapter therein, and
the first and second sealing elements seal and interpose respective exteriors of the first and second sealing boots and respective ones of the first and second seal nuts and are directly attached thereto.

2. The connector housing apparatus of claim 1, wherein,
a first fiber optic cable connected to the first fiber optic pigtail, the first sealing element, the first seal nut and a tapered section of the first sealing boot form a first seal, and
a second fiber optic cable connected to the second fiber optic pigtail, the second sealing element, the second seal nut and a tapered section of the second sealing boot form a second seal.

3. The connector housing apparatus of claim 2, wherein,
the connector housing body comprises a first snap finger and a second snap finger at its opposite ends,
the first sealing boot comprises a receiving catch,
the second sealing boot comprises a receiving catch,
the first snap finger of the connecter housing body and the receiving catch of the first sealing boot are connected to form a third seal; and
the second snap finger of the connecter housing body and the receiving catch of the second sealing boot are connected to form a fourth seal.

4. The connector housing apparatus of claim 3, wherein the connector housing body further comprises a snap finger release tab to allow for disengaging of the sealing boot from the connector housing body.

5. The connector housing apparatus of claim 2, wherein the first sealing element and the second sealing element are at least one of elastomer seal grommet, b-sealing tape, closed cell foam tape, compressible elastomer and molded grommet.

6. The connector housing apparatus of claim 2, wherein,
the first seal boot and the second seal boot further comprise a seal nut retention groove, a sealing element compression dam to hold the first sealing element and the second sealing element, and a ram quarter turn twist lock feature,
the first seal nut is connected to the first seal boot using the seal nut retention groove of the first seal boot,
the second seal nut is connected to the second seal boot using the seal nut retention groove of the second seal boot, and
the first seal nut and the second seal nut use the ram quarter turn twist lock feature for seal nut compression lock.

7. The connector housing apparatus of claim 1, wherein the connector housing body comprises an enclosure mounting shoulder and external threads on one end allowing for installation of the connector housing apparatus on an enclosure.

8. The connector housing apparatus of claim 7, further comprising a locking nut,
wherein, the connector housing apparatus can be mounted onto an exterior surface of the enclosure using the locking nut.

9. The connector housing apparatus of claim 7, wherein the connector housing body shoulder and the connector housing body are sized to fit National Pipe Taper (NPT) port sizes.

10. The connector housing apparatus of claim 1, wherein the fiber optic adapter insert comprises a receiving catch which snaps into a retention tab on the inner surface of the connector housing body.

11. The connector housing apparatus of claim 1, wherein,
the fiber optic adapter insert comprises a cutout which can be modified to accommodate a variety of fiber optic adapters, and
the fiber optic adapter insert cutout can be modified to accommodate one or more adapters.

12. The connector housing apparatus of claim 11, wherein the variety of fiber optic adapters is one of a simplex FC, simplex ST, simplex LC, simplex SC, simplex MU, duplex LC, duplex MU, and MPO/MTP adapter.

13. The connector housing apparatus of claim 1, wherein,
the first fiber optic pigtail comprises a fiber optic connector body and a fiber optic connector boot, the second fiber optic pigtail comprises a fiber optic connector body and a fiber optic connector boot, and
the fiber optic connector body of the first fiber optic pigtail and the fiber optic connector body of the second fiber optic pigtail are connected with the fiber optic adapter.

14. The connector housing apparatus of claim 1, further comprising:
a first O-Ring; and a second O-Ring, wherein,
the connector housing body comprises a first groove which holds the first O-Ring and a second groove which holds the second O-Ring, when the first sealing boot is connected to the connector housing body, the first sealing boot, the first O-Ring and the connector housing body form a seal, and
when the second sealing boot is connected to the connector housing body, the second sealing boot, the second O-Ring and the connector housing body form a seal.

15. The connector housing apparatus of claim 1, further comprising:
a first O-Ring; and a second O-Ring, wherein,
the first sealing boot comprises a first groove on its interior surface which holds the first O-Ring, the second sealing boot comprises a second groove on its interior surface which holds the second O-Ring, when the first sealing boot is connected to the connector housing body, the first sealing boot, the first O-Ring and the connector housing body form a seal, and when the second sealing boot is connected to the connector housing body, the second sealing boot, the second O-Ring and the connector housing body form a seal.

16. The connector housing apparatus of claim 1, wherein the connector housing apparatus can be disassembled and reassembled.

17. The connector housing apparatus of claim 1, wherein the connector housing apparatus can be mounted to a bulkhead in at least one of a single and gang mounted manner.

18. The connector housing apparatus of claim 1, wherein the connector housing apparatus can be installed on one of an enclosure, closure, terminal and junction box.

19. The connector housing apparatus of claim 1, wherein the connector housing body comprises a conduit transition adapter allowing installation of the connector housing apparatus on a conduit pipe.

20. The connector housing apparatus of claim 1, further comprising:
a wall mount adapter bracket, wherein,
the connector housing body further comprises a recessed pocket, and
the recessed pocket mates with the wall mount adapter bracket allowing for installation of the connector housing apparatus on one of walls and rails.

21. The connector housing apparatus of claim 1, wherein,
the first sealing boot forms a seal which protects against the effect of immersion in a liquid to a depth of up to 1 m, and the second sealing boot forms a seal which protects against the effect of immersion in a liquid to a depth of up to 1 m.

22. The connector housing apparatus of claim 1, wherein
the connector housing body is a singular tube having a rectangular, cross-sectional shape, and
the fiber optic adapter insert extends from within the connector housing body to outside of the connector housing body.

\* \* \* \* \*